Dec. 10, 1940. W. J. GUILD 2,224,386
ROTARY TOOL FOR BORING AND LIKE OPERATIONS
Filed Nov. 17, 1937
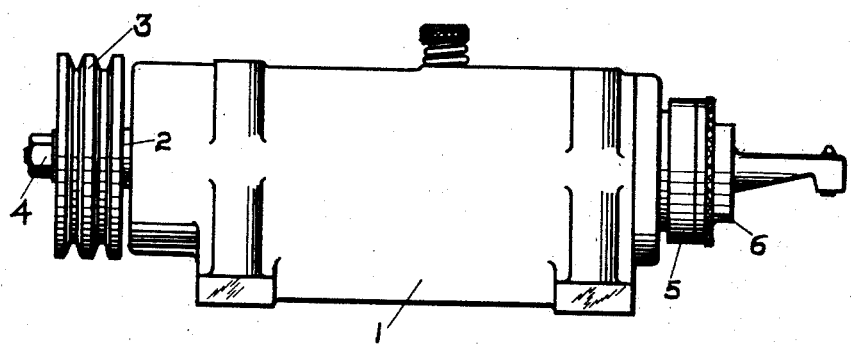
Fig. 1
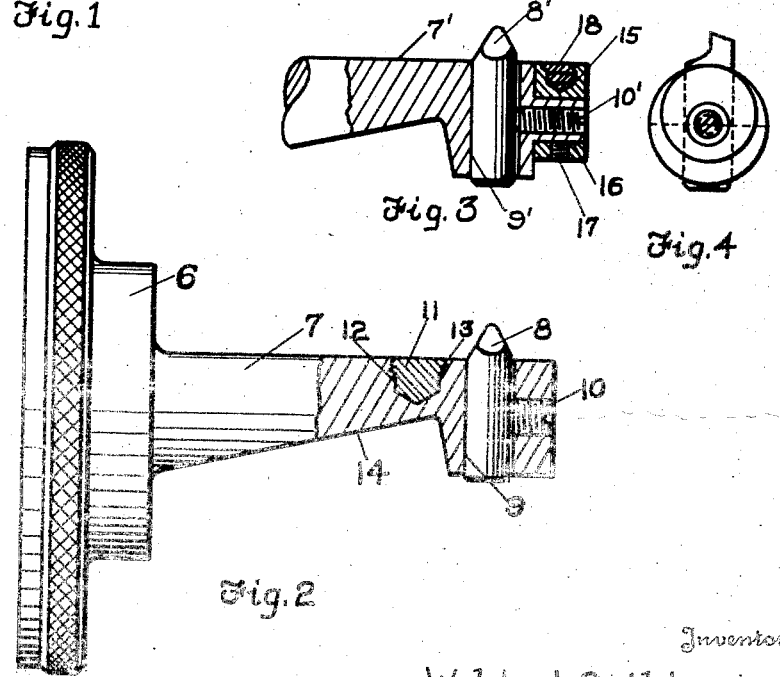
Inventor
Waldo J. Guild Patented Dec. 10, 1940

2,224,386

UNITED STATES PATENT OFFICE 2,224,386

ROTARY TOOL FOR BORING AND LIKE OPERATIONS

Waldo J. Guild, Worcester, Mass., assignor to The Heald Machine Company, Worcester, Mass., a corporation of Massachusetts Application November 17, 1937, Serial No. 175,105

6 Claims. (Cl. 77—3)

The present invention relates to a rotary tool, especially adapted for boring machines, and provides for an automatic radial retraction of the tool point before the withdrawal of the tool from the workpiece bore takes place, so as to prevent scoring or scratching of the tooled surface by such withdrawal movement.

The present invention provides an extremely simple arrangement by which a rotary boring tool may be retracted from operative position merely by reducing the rate of spindle rotation, or by stopping the spindle.

This surface scoring or marring above referred to has been avoided in certain instances, as for example, by the tool spindle construction of the Schmidt Patent No. 2,058,360, dated October 20, 1936. Although the device of this patent is entirely satisfactory in operation, the movement of the tool into or out of operative position is dependent upon turning movement of the spindle which carries the tool within the main spindle, and this tool carrying spindle must be located eccentrically of the main boring head spindle in order for the radial shifting movement of the tool to be obtained. One of the principal features of the present invention resides in the provision of an extremely simple structure which will cause the boring tool to move radially outward into cutting position only when the boring spindle is rotating at the proper rate of speed, and will therefore obtain an offsetting or retraction of the tool point from the tooled surface when the rate of rotation is substantially reduced. The device of the present invention may be incorporated, if desired, in the usual spindle which is journalled in the head of an ordinary boring machine, and it involves no moving parts which can fail to function.

In accordance with the present invention, the rotary spindle which carries the boring tool is purposely put out of balance adjacent to the tool so that the projecting end of the tool, when the spindle is rotating, will be moved outwardly by centrifugal force from the normal position of the spindle when at rest. This outward movement is controlled by the amount that the spindle is unbalanced and by the rate of rotation of the spindle. The boring tool obviously projects radially from the spindle on the heavy side thereof. In certain instances the spindle may have a provision thereon for adjusting the amount that the spindle is out of balance as by an adjustable member on the spindle, the center of gravity of which may be moved toward or away from the center of the spindle.

Other and further objects and advantages of the invention will more fully appear from the following detailed description taken in connection with the accompanying drawings in which—

Fig. 1 is a side elevation of a boring head embodying the invention.

Fig. 2 is a larger scale side elevation, partly in section, of the overhanging portion of the boring spindle of Fig. 1.

Fig. 3 is a similar fragmentary sectional view, showing a modification of the invention.

Fig. 4 is an end view of the spindle of Fig. 3.

Like reference characters refer to like parts in the different figures.

The rotary tool of my invention may be used on any of the conventional types of boring machines. In machines of this character the base usually provides ways for the reciprocation of a table or carriage on which either the workpiece or the boring head is mounted, the other of these elements being mounted on a bridge which is secured to the base of the machine.

In such machines, the travel of the table in one direction procures a boring operation on the workpiece, and thereafter the tool is withdrawn from within the workpiece bore by movement of the table in the opposite direction. Prior to reversal of the table movement, and after the boring tool has completed its cutting action on the workpiece, the rotating boring spindle is stopped, preferably by any automatically actuated mechanism, and it is this stopping of the spindle rotation which obtains, according to my invention, the desired slight spacing of the tool point from the finished workpiece surface. It will be understood that in the use of a boring head of the type hereinafter described, it is not necessary that the boring spindle be brought to rest, since a substantial reduction in the rate of rotation of the spindle is sufficient to provide for the desired radial retraction.

Fig. 1 shows a conventional boring head which comprises a housing 1 wherein is journalled a spindle 2, preferably on axially spaced bearings, not shown, at opposite ends of the housing. On one end of the spindle is mounted a pulley 3, being held thereon as by a clamping nut 4, and this pulley is connected to a suitable source of power for a rotation of the spindle. It will be understood that the mechanism which controls the rotation of the spindle is incorporated in the boring machine between the pulley 3 and the power source.

On the end of the spindle opposite to the pulley is a head 5 integral with the spindle, and to this head is suitably secured a quill of the construction shown in Fig. 2, the same being designated generally by the reference numeral 6. Obviously, according to my invention, the quill 6 and the plate or head 5 may, if desired, be integral, but as here shown the quill 6 is a separate element in order that the boring head may be adapted to various sizes of boring tools merely by the removal of one quill and the attachment of a different quill.

The quill 6 provides a stub shaft 7 having its axis substantially concentric to the axis of a spindle 2, and a boring tool 8 extends radially of the stub shaft adjacent the end thereof, being positioned in a radial bore 9 and being locked in position by a set screw 10. The stub shaft 7 is unbalanced by a plug 11 of heavier material than that of the stub shaft, as for example, lead, which is positioned in a small bore 12 in the shaft and is locked therein, as by the cooperating screw threads 13. It will be noted that the plug 11 is on the same side of the shaft as the point of the boring tool 8.

To further unbalance the shaft, a notch 14 is formed therein on the side opposite to the plug 11, this notch being preferably arranged to provide for a gradual decrease in the cross sectional area of the shaft 7 as its overhang beyond the supporting structure, increases. This notch is formed in the stub shaft 7 on the side opposite to the point of the cutting tool and may, as shown in the drawing, extend to the center of the shaft. The shaft 7, at the point where the boring tool is located, is preferably full-size to provide a substantial support for the tool. This notch not only aids in unbalancing the overhanging end of the shaft 7, but also provides for more flexibility of the shaft adjacent the end thereof.

In operation, the stub shaft 7, which so far as the present invention is concerned, may be considered to be integral with the spindle 2, is rotated at a predetermined rate of speed, and the unbalancing effect of the plug 11, together with the notch 14, causes the end of the shaft 7 to swing outwardly by centrifugal force away from the normal position thereof, so that the point of the boring tool 8 defines a circle slightly larger in radius than the amount which the boring tool extends beyond the axis of rotation of the spindle when the latter is at rest. When the boring operation is completed, and prior to axial withdrawal of the tool from the workpiece bore, the spindle rotation is discontinued or slowed down, whereupon the inherent resiliency of the shaft 7 causes the overhanging end thereof to return to its original position, thereby effecting a slight radial retraction of the point of the boring tool from its cutting position assumed during the relatively high-speed rotation of the spindle. It has been found that by accurately controlling the amount that the spindle is out of balance, and also by controlling the speed of rotation of the spindle, the radius of the cylinder generated by the tip of the boring tool in its rotation can be accurately determined.

In the modification shown by Figs. 3 and 4, the shaft 7' corresponding to the stub shaft 7 above, has the boring tool 8' which extends radially thereof, being locked in position by a set screw 10'. The end of the shaft 7' beyond the bore 9' in which the tool is located has mounted for rotation thereon an eccentric ring 15, the latter being turnable on a small diameter portion 16 of the shaft. A set screw 17 provides for locking the eccentric ring against rotation. If desired, a plug 18 of heavy material, such as lead, may be positioned in the eccentric ring 15 to increase the out-of-balance effect of the ring. The effect of the eccentric ring is similar to that of the heavy plug 11 above described.

For a predetermined rate of rotation of the spindle it will be apparent that the outward radial displacement of the cutting point of the tool may be adjusted by turning the eccentric ring 15 relative to the boring spindle. For a maximum radial outward displacement of the cutting point of the tool the plug 18 should be in the same radial plane as the cutting point and on the same side of the spindle axis. Shifting of the eccentric ring through a relatively small angle will provide for decreasing the radial displacement of the cutting point of the tool relative to the spindle axis.

It will be understood that boring tools of the character above described are intended for use in boring operations where only a relatively small amount of material is to be removed. Thus the amount that the cutting point of the tool should move radially outwardly relative to the spindle axis is very small, as for example, one or two ten-thousandths of an inch. This slight amount of radial movement provides for a sufficient back-off of the tool when the spindle rotation is substantially diminished, or discontinued, so that the point of the tool will not engage the surface operated upon by the tool after the boring operation has been completed.

Not only may the amount by which the cutting point of the tool moves centrifugally outward be varied by means of the eccentric ring 15, but the amount of projection of the tool may also be varied by controlling the rate of rotation of the spindle. Thus, the faster the spindle is rotated, the greater the centrifugal force exerted on the spindle by the plug 11 or the plug 18, thereby causing a greater radial displacement of the tool point as the rate of spindle rotation increases. Although, during the boring operation the tool is held in proper boring position by centrifugal force, it has been found that an extremely fine finish may be obtained as well as a very accurate maintenance of size. The device has also been found to work satisfactory when removing relatively large quantities of material.

From the foregoing it will be apparent that the present invention resides in providing a rotary tool spindle which is out of balance at a point adjacent to the boring tool so that as the tool is rotated the spindle springs outwardly from its normal axis sufficient to cause a predetermined radial outward displacement of the tip of the boring tool. The boring head may have the spindle journalled therein so constructed as to be out of balance at its overhanging end, or an auxiliary out-of-balance spindle may be mounted on the end of the main spindle for rotation as a unit therewith. In either event, the result is a spindle which carries a boring tool in the end thereof and has the capacity for a radial retraction of the boring tool when the spindle rotation is substantially decreased, or is discontinued.

I am aware that it is not new to mount a rotary impact or chipping tool in eccentric relation on a slender flexible drive shaft, the latter, as described in the patent to Gustafsson No. 1,692,500 of Nov. 20, 1928, adapted in the operation of said tool to flex and yield in a wholly uncontrolled manner in response to centrifugal action as well as to the tool's impact upon and rebound from the surface engaged thereby; I make no claim to any such arrangement, but what I do claim and desire to secure by United States Letters Patent is as follows.

I claim:

1. A device of the class described, comprising a housing, a rotary spindle journaled therein with its end overhanging and projecting therefrom, and a boring tool carried by and projecting radially from said spindle's projecting end, the latter having means in fixed relation to said tool for unbalancing the spindle with the heavy side of the spindle on the same side of the spindle axis as the cutting point of said tool, whereby the latter with the spindle rotating at a pre-determined speed is displaced centrifugally in sufficient amount for a boring operation, but with the spindle slowed down or stopped is spaced slightly from the bored surface.

2. A device of the class described comprising a spindle mounted for rotative movement and having a relatively-rigid overhanging end, a cutting tool projecting radially from said overhanging end, the latter inwardly of said tool being notched or cut away for making said overhang slightly resilient and for unbalancing the spindle, and a heavy plug fixed to said overhanging end on the side opposite to the notch for further unbalancing the spindle, the notch being on the side of the spindle opposite to the point of the tool and the plug being on the same side as the point of the tool whereby the latter with the spindle rotating at a predetermined speed is displaced centrifugally in sufficient amount for a cutting operation, but with spindle slowed down or stopped, is spaced from the tooled surface.

3. A device of the class described comprising a spindle mounted for rotative movement and having a relatively-rigid overhanging end, a boring tool projecting radially from said overhanging end, the latter inwardly of said tool being notched or cut away for making said overhang slightly resilient and for unbalancing the spindle, said notch extending substantially to the center line of the spindle the notch being on the side of the spindle opposite to the point of the tool whereby the latter, with the spindle rotating at a predetermined speed is displaced centrifugally in sufficient amount for a boring operation, but with the spindle slowed down or stopped is spaced from the bored surface.

4. A device of the class described, comprising a spindle mounting, a rotary spindle journaled therein and having a portion overhanging said mounting, a tool projecting radially of said overhanging portion, and means carried by said overhanging portion in fixed relation to and adjacent the tool for unbalancing the spindle, to cause, with the spindle rotating at a predetermined speed, a slight outward displacement of the cutting point of said tool, said balancing means comprising a weighted ring eccentric to the spindle axis and mounted for turning movement thereon to vary said displacement.

5. In a displacement, a housing, a spindle journalled therein, a tool projecting radially of the spindle, and means carried by the spindle for unbalancing the spindle adjacent to the tool for causing a radial outward displacement of the cutting point of the tool relative to the axis of the spindle, said radial movement being dependent upon the rate of spindle rotation and said means including a weight eccentrically positioned in the spindle adjacent to the tool.

6. In a device of the class described, a housing, a spindle journalled therein, a tool projecting radially of the spindle, and means carried by the spindle for causing a radial outward displacement of the cutting point of the tool relative to the axis of the spindle in response to the spindle rotation, said radial displacement being proportional to the rate of spindle rotation, said means including a notch in the side of the spindle opposite to the tool point and a weight eccentrically positioned in the spindle on the side of the spindle adjacent to the point of the tool.

WALDO J. GUILD.

CERTIFICATE OF CORRECTION.

Patent No. 2,224,386. December 10, 1940.

WALDO J. GUILD.

It is hereby certified that error appears in the printed specification of the above numbered patent requiring correction as follows: Page 3, second column, line 21, claim 5, for the word "displacement" read --device of the class described--; and that the said Letters Patent should be read with this correction therein that the same may conform to the record of the case in the Patent Office.

Signed and sealed this 28th day of January, A. D. 1941.

(Seal)

Henry Van Arsdale,
Acting Commissioner of Patents.